(12) United States Patent
Lee et al.

(10) Patent No.: US 10,922,270 B2
(45) Date of Patent: Feb. 16, 2021

(54) ADAPTIVE DATA RECORDING METHOD IN VEHICLE IMAGE RECORDING DEVICE

(71) Applicant: Pittasoft Co., Ltd., Seoul (KR)

(72) Inventors: Tae-Yun Lee, Seoul (KR); Hyun-Chul Im, Seoul (KR); Gye-Hyeon Gyeong, Seoul (KR)

(73) Assignee: PITTASOFT CO., LTD., Seoul (KR)

( * ) Notice: Subject to any disclaimer, the term of this patent is extended or adjusted under 35 U.S.C. 154(b) by 426 days.

(21) Appl. No.: 15/884,678

(22) Filed: Jan. 31, 2018

(65) Prior Publication Data

US 2018/0218001 A1  Aug. 2, 2018

(30) Foreign Application Priority Data

Feb. 1, 2017  (KR) .................... 10-2017-0014455

(51) Int. Cl.
*G06F 16/00* (2019.01)
*G06F 16/13* (2019.01)

(52) U.S. Cl.
CPC .................................. *G06F 16/13* (2019.01)

(58) Field of Classification Search
CPC ........ G06F 16/13; G06F 16/164; G06F 16/16; G06F 16/11; G06F 16/10; Y10S 707/99956; H04N 5/772; H04N 21/4334
See application file for complete search history.

(56) References Cited

U.S. PATENT DOCUMENTS

| | | | |
|---|---|---|---|
| 5,442,611 A * | 8/1995 | Hosaka | G06F 3/0601 369/47.23 |
| 2005/0076063 A1* | 4/2005 | Andoh | G06F 11/1435 |
| 2009/0112951 A1* | 4/2009 | Ryu | G06F 12/023 |
| 2010/0312807 A1* | 12/2010 | Mitsuzumi | G06F 16/116 707/825 |

(Continued)

FOREIGN PATENT DOCUMENTS

| | | | | |
|---|---|---|---|---|
| JP | 2003173282 A | * | 6/2003 | G06F 3/06 |
| JP | 200852767 A | * | 6/2008 | G11B 20/10 |
| KR | 20090119481 A | * | 11/2009 | G06F 11/14 |

OTHER PUBLICATIONS

Improving File System Performance and Reliability of Car Digital Video Recorders, Kim et al, ,IEEE Transactions on Consumer Electronics, vol. 61, No. 2, May 2015 (Year: 2015).*

*Primary Examiner* — Augustine K. Obisesan
(74) *Attorney, Agent, or Firm* — Nixon & Vanderhye P.C.

(57) ABSTRACT

Provided is an adaptive data recording method of recording data in a storage medium using a file allocation table (FAT) file system by a data recording device, the method includes: receiving the data; creating at least one file in which the data is recorded, configuring a cluster chain by sequentially connecting cluster addresses according to an FAT of the storage medium, and recording the data at a actual position of each cluster address; when a file termination interrupt occurs, terminating the file by terminating the cluster chain of the file under data recording, creating a new file, configuring a new cluster chain, and continuously recording the (Continued)

data; and if a residual capacity of the storage medium is less than a predetermined spare capacity when creating a new file, selecting at least one file which is terminated after previous data recording, and continuously recording the data reusing the cluster chain of the selected file.

6 Claims, 4 Drawing Sheets

(56) References Cited

U.S. PATENT DOCUMENTS

| | | | | |
|---|---|---|---|---|
| 2013/0179626 A1* | 7/2013 | Chang | ............ | G06F 12/1009 |
| | | | | 711/103 |
| 2015/0277784 A1* | 10/2015 | Kondou | ............ | G06F 3/0608 |
| | | | | 710/26 |
| 2017/0177267 A1* | 6/2017 | Shin | ............ | G06F 3/0631 |

* cited by examiner

[Fig. 1]
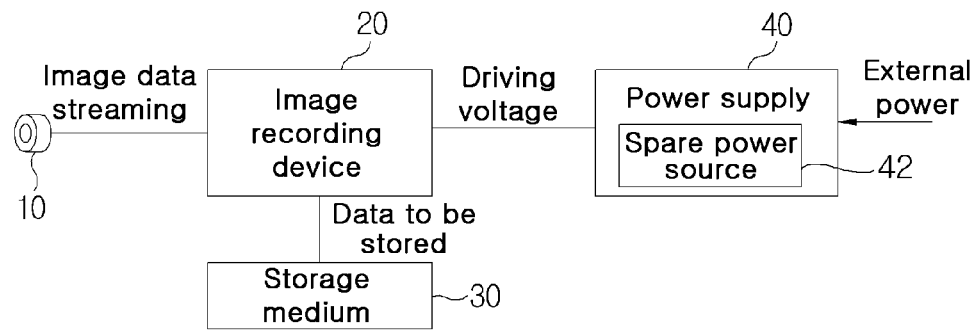

[Fig. 2]
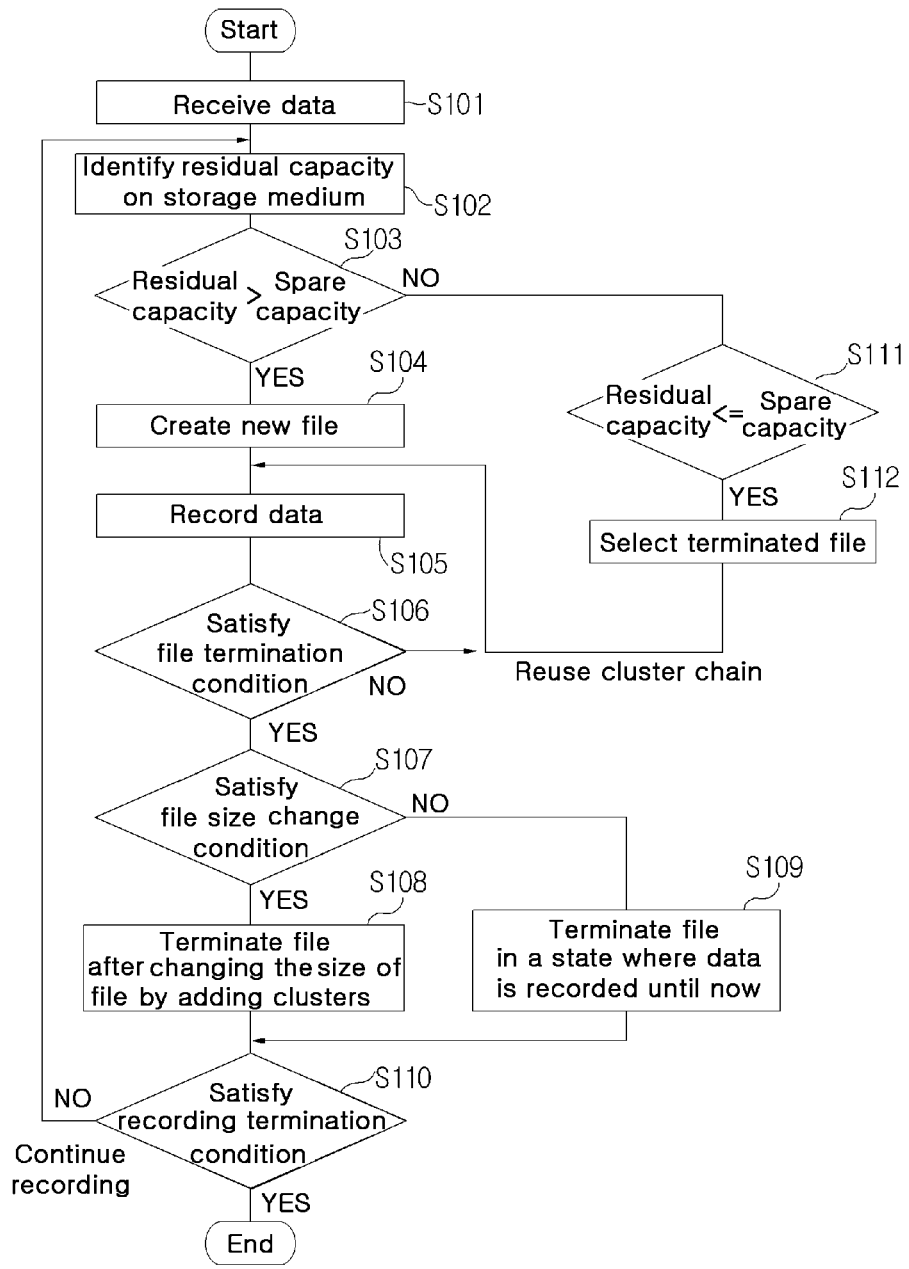

[Fig. 3]
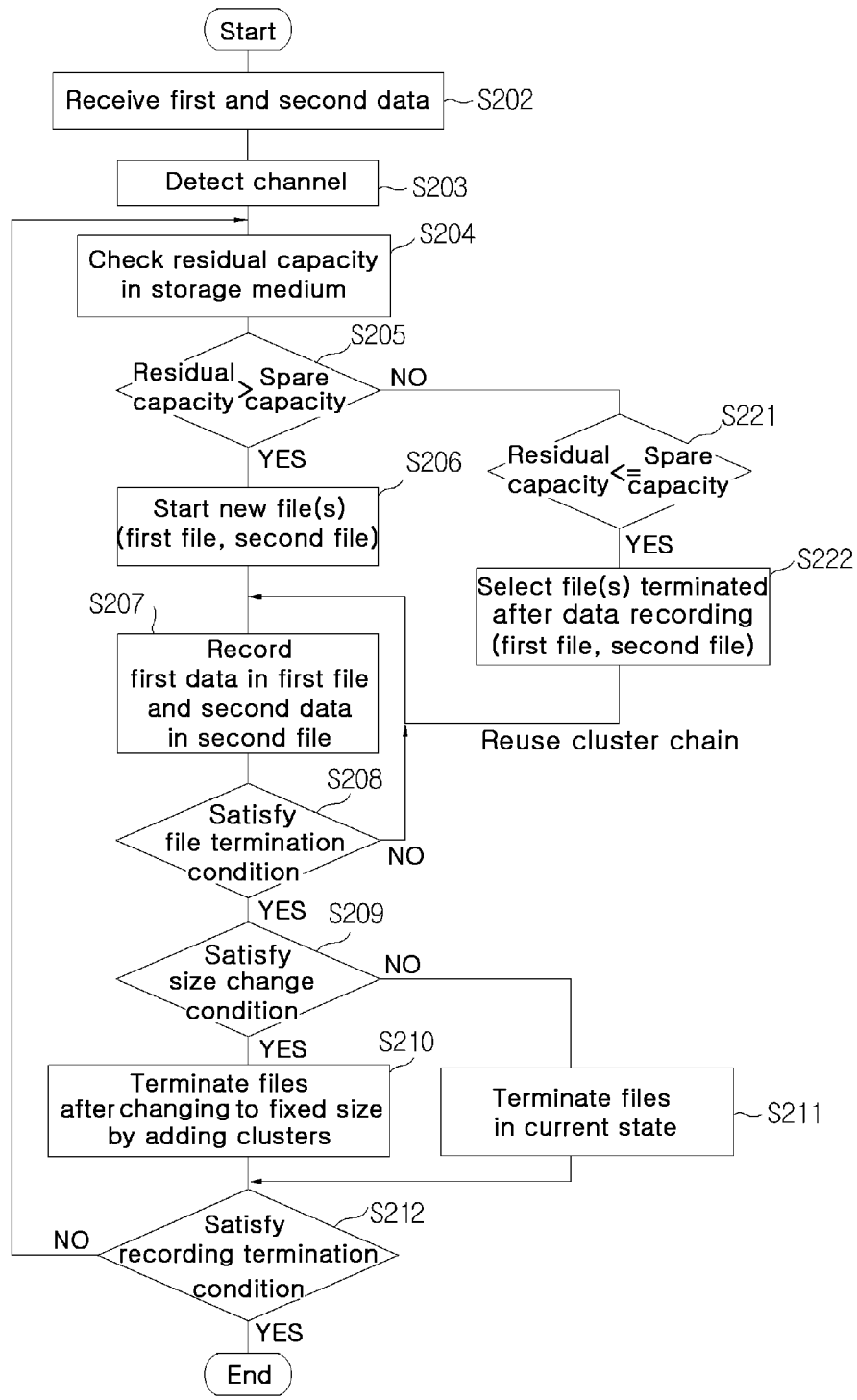

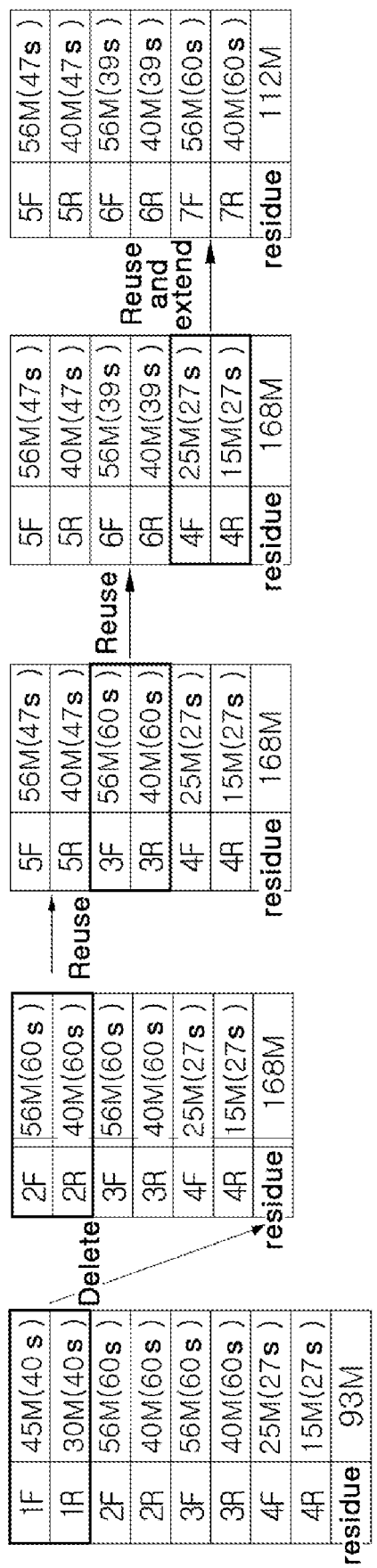
[Fig. 4]

ADAPTIVE DATA RECORDING METHOD IN VEHICLE IMAGE RECORDING DEVICE

BACKGROUND

Cross-Reference

This application claims priority to KR Patent Application No. 10-2017-0014455 filed Feb. 1, 2017, the entire contents of which is hereby incorporated by reference.

1. Technical Field

The present invention relates to a method of efficiently storing transmitted data in a storage medium, and more particularly, to a method of adaptively recording data by a vehicle image recording device.

2. Related Art

In recent years, a file allocation table (FAT) file system has been widely used in a relatively small capacity storage medium used as a removable storage device.

The following is a table 1 indicated by visualizing a structure of a storage medium to which a general FAT is applied.

TABLE 1

| Boot Record | Reserved Area | FAT #1 | FAT #2 | Root Directory | Data Area | Unused Area |
| --- | --- | --- | --- | --- | --- | --- |

Respective configuration elements listed in the table 1 have functions as follows.

- A Boot Record stores boot codes for booting the system and values of an FAT file system.
- A Reserved Area is configured by 32 Sectors, wherein a first sector is a boot record and a reserved space which is empty for the future.
- A FAT Area is a space for collecting tables to manage clusters configuring a storage medium, and is divided into a FAT #1 and a FAT #2 for Backup. Since information on cluster chains configuring files is stored in the space, if the space is damaged, a corresponding file cannot be used. A FAT32 file system indicates an assignment state from a start cluster of a data area to a final cluster thereof using 32 bits.
- A Root Directory is included in a Data Area, and a position of the root directory is recorded in a boot record.
- A Data Area is an area for storing the data of files or root directory information. The data area is divided into cluster units and reading and writing are achieved per cluster unit.
- A Sector is a minimum unit of storage space where a computer may designate an address. A computer reads or records data per sector unit.
- A Cluster is a logical unit to store a file in a storage medium. The cluster includes one or more sectors.
- A Directory Entry is recorded in the data area, and a file name, an extension, a file size, a modified date, and a start cluster of a file are recorded in the directory entry. A directory entry of files and directories in a root directory are included in a root directory area. However, a directory entry of files and directories in a sub-directory are included in a data area.
- A Cluster chain is configured in a FAT area and indicates an order of a cluster recording data.

In order to record data by a FAT file system as described above, an example of configuring a cluster chain is described with reference to a following table 2.

TABLE 2

| XXXXXXXX | XXXXXXXX | 00000007 | 00000004 |
| --- | --- | --- | --- |
| 00000005 | 00000008 | 00000000 | 00000009 |
| FFFFFFFF | 0000000A | 0000000B | 00000012 |
| 0000000D | 0000000E | FFFFFFFF | 00000000 |
| 00000000 | 00000000 | FFFFFFFF | 00000000 |
| 00000000 | 00000000 | 00000000 | 00000000 |
| 00000000 | 00000000 | 00000000 | 00000000 |
| 00000000 | 00000000 | 00000000 | 00000000 |
| 00000000 | 00000000 | 00000000 | 00000000 |
| 00000000 | 00000000 | 00000000 | 00000000 |
| 00000000 | 00000000 | 00000000 | 00000000 |

A sequential order may be set to each cell of the table 2 with a hexadecimal number such as 0, 1, 2, 3, 4, 5, 6, 7, 8, 9, A, B, C, D, E, F, 10, 11, . . . .

Further, a cluster chain with respect to each data may be configured as illustrated in a following table 3.

TABLE 3

Root Directory: 2-7-9-A-B-12
File 1: 3-4-5-8
File 2: C-D-E

In the table 3, a root directory information is recorded in the order of 2, 7, 9, A, B and 12, sequentially.

A File 1 is recorded in the order of 3, 4, 5 and 8, sequentially.

Likewise, a File 2 is recorded in the order of C, D, and E.

The FAT file system having a structure as described above may be used in various devices and has many compatible devices. However, as a content of a file becomes longer, an operation of selecting one cluster address from a FAT area, linking the cluster address to a previous cluster address, searching a cluster in a data area matching with the selected cluster address and recording data must be repeated. When one file is completely recorded, a cluster chain corresponding to the file is created in a FAT. When deleting the file, an unallocated cluster is marked at a first address of a cluster chain corresponding to the file in the FAT.

Meanwhile, if an operation of creating and deleting a file by the above operation principle is repeated, a cluster chain of the FAT may be broken or cross-connected with other chains.

SUMMARY

The present invention has been made in view of the above problems, and provides an adaptive data recording method of minimizing damage of a cluster chain or the occurrence of cross-connected failure by an operation for creating and deleting files in a vehicle image recording device.

According to the present invention as described above, even if a storage medium using a FAT file system repeats an operation for creating and deleting a file, damage of a cluster chain or the occurrences of cross-connected failure are minimized.

According to an embodiment, an adaptive data recording method of recording data in a storage medium using a file allocation table (FAT) file system by a data recording device may comprise: receiving the data; creating at least one file in which the data is recorded, configuring a cluster chain by sequentially connecting cluster addresses according to an FAT of the storage medium, and recording the data at a actual position of each cluster address; when a file termination interrupt occurs, terminating the file by terminating the cluster chain of the file under data recording, creating a new file, configuring a new cluster chain, and continuously recording the data; and if a residual capacity of the storage medium is less than a predetermined spare capacity when creating a new file, selecting at least one file which is terminated after previous data recording, and continuously recording the data reusing the cluster chain of the selected file.

According to a further embodiment, when a file is terminated according to the file termination interrupt, the method may further comprise changing the size of a file to be terminated to a predetermined fixed size by adding at least one cluster address to the cluster chain if the size of the file in which the data is recorded up to now satisfies a predetermined size range.

According to a further embodiment, when the size of a file selected in order to reuse the cluster chain is less than a lower limit of a predetermined size range, the method may further comprise continuously recording the data by extending the cluster chain by sequentially and additionally connecting a cluster address in the residual capacity to the cluster chain of the file.

According to a further embodiment, when the size of a file selected to reuse the cluster chain is less than a lower limit of a predetermined size range and the residual capacity of the storage medium is less than a minimum of spare capacity of the storage medium, the method may further comprise deleting the selected file, selecting another file, and continuously recording the data reusing the cluster chain of the selected another file.

According to a further embodiment, the adaptive data recording method may be a vehicle image recording method of recording image/sound data around a vehicle photographed and recorded by an image recording device, and the file termination interrupt may further comprise at least one of recording the image/sound data for a predetermined time, stopping the supply of an external power source to the image recording device, detecting shock by the image recording device, stopping or restarting the reception of the image/sound data, finding out a new object different from a previous one in the photographed image, or a specific operation by user for the image recording device.

According to another embodiment, an adaptive data recording method of recording first and second data in a storage medium using a file allocation table (FAT) file system by a data recording device may comprise steps of: receiving the first and second data; creating a first file in which the first data is recorded and a second file in which the second data is recorded, configuring first and second cluster chains respectively by sequentially connecting cluster addresses with reference to an FAT of the storage medium, and recording the first and second data at actual positions of each cluster address of the cluster chains, respectively; when a file termination interrupt occurs, terminating the first and second files by terminating the cluster chain of each file under data recording, creating new first and second files, configuring new first and second cluster chains of the new first and second files, and continuously recording the first and second data in each file; and if a residual capacity of the storage medium is less than a predetermined spare capacity when creating the new first and second files, selecting at least one of the first and second files which are terminated after previous data recording, and continuously recording the first and second data reusing first and second cluster chains of the selected first and second files.

According to a further embodiment, when the files are terminated according to the file termination interrupt, the method may further comprise, when the size of the first file in which data is recorded up to now satisfies a first predetermined size range, changing the size of the first file to be terminated to a first predetermined fixed size by adding at least one cluster address to the first cluster chain; and when the size of the second file in which data is recorded up to now satisfies a second predetermined size range, changing the size of the second file to be terminated to a second predetermined fixed size by adding at least one cluster address to the second cluster chain.

According to a further embodiment, when the reception of the second data is stopped, the second file which is terminated after data recording may be changed to a new first file and recorded the first data; and then when the reception of the second data restarts, the first file which is terminated after data recording may be changed to a new second file and recorded the second data.

BRIEF DESCRIPTION OF THE DRAWINGS

The objects, features and advantages of the disclosure will be more apparent from the following detailed description in conjunction with the accompanying drawings, in which, FIG. 1 is a block diagram of a vehicle image recording device and peripheral configurations thereof capable of implementing an adaptive data recording method according to the present invention;

FIG. 2 is a flowchart schematically illustrating an adaptive data recording method according to an embodiment of the present invention;

FIG. 3 is a flowchart illustrating an overall procedure of an adaptive data recording method according to another embodiment of the present invention; and FIG. 4 is a diagram describing with reference to a memory structure, an example of recording data by the adaptive data recording method illustrated in FIG. 3.

DETAILED DESCRIPTION

First, an image recording device and peripheral configurations thereof capable of implementing an adaptive data recording method according to the present invention will be simply described with reference to FIG. 1.

The image recording device 20 according to the present invention may be operated by connection with a camera 10, a storage medium 30 and a power supply 40.

The camera 10 photographs a front image to create image data. In this case, the camera 10 continuously creates and outputs (or streams) the image data in the form of a real time moving image. Meanwhile, a microphone may be disposed around the camera 10, and the image data may further include sound data. That is, it must be understood that the image data may include sounds as well as images in this specification.

The storage medium 30 includes a built-in memory chip in the vehicle image recording device 20 or various types of removable media which may be coupled with a communication slot included in the vehicle image recording device 20. The storage medium 30 may be logically divided into cluster units in which respective addresses may be indicated, and image data may be divided into each cluster to be recorded. Further, the storage medium is configured so that an image recording device or other controllers (for example, a computer) may read image data recorded in a cluster corresponding to any address of the storage medium.

Meanwhile, in the present invention, in order to enhance recording or reading compatibility for various controllers, the image recording device 20 is regarded to use the storage medium 30 in a FAT file system (for example, FAT16 or FAT32) method.

The power supply 40 supplies a driving voltage generated using a DC or AC voltage of an external power source to the image recording device 20. For example, in case of the image recording device 20 is a vehicle image recording device (generally, dashboard camera, so called 'black box'), the external power supply may be a vehicle battery. Further, the power supply 40 may modulate or convert a DC or AC voltage of the vehicle battery into any other level or waveform of voltage to apply to the dashboard camera.

Meanwhile, the power supply 40 may further include a spare power source 42 such as a rechargeable battery. When the power supply 40 is normally connected to an external power source and operated, it supplies a driving voltage using the external power source and charges the spare power source 42. Further, when an operation of the external power source is stopped or the external power source is disconnected, a driving voltage is supplied using the spare power source 42.

The image recording device 20 receives the image data streamed from the camera 10, encodes the received image data by a predetermined codec, and records the encoded image data in the form of a moving image file in the storage medium 30. In general, the image recording device 20 may create a new moving image file per any time unit, for example, per 1 minute. Moreover, in case of the external power source is disconnected so that a driving voltage is applied from the spare power source 42, the image recording device 20 may finish a currently recording file, create a new file, and continuously record a received image in the new created file.

In addition, the image recording device 20 according to the present invention creates a new file to record data when firstly recording image data in the storage medium. After a total stored capacity of recorded files reaches a predetermined limit of the storage medium 30, the image recording device 20 selects one from previously recorded files (for example, the oldest file after created and/or terminated or a file selected in any order) and then changes a file name to reuse a memory space used in the file.

Here, the reuse of a file means, in the case of recording a file using a FAT file system, reusing a cluster chain of a terminated file without change.

Further, in the present invention, the image recording device 20 may control the size of a file to be terminated to a predetermined size. For example, when terminating a file, by adding any unused cluster addresses to a cluster chain configured until termination time, the size of the file to be terminated is changed to that of a file having larger data amount than an amount of actually recorded data. The image data is not recorded in the actual area of the added cluster in this time of a current recoding operation. However, when the cluster chain is reused and image data is recorded over the size of previously recorded image data, the exceeded image data may be recorded in the added cluster.

In the specification, the image recording device 20 according to the present invention may be a vehicle dashboard camera which is installed at a vehicle and records a photographed image in the form of a moving image file.

Moreover, a general dashboard camera may be configured to record images in each of new file every minute ('normal termination condition'). If situations other than the normal termination condition occur, for example, when the dashboard camera is disconnected with a vehicle battery, when the reception of image data stops or restarts, when a shock greater than a reference value is detected by a shock detector, when an object moving around a vehicle is detected or an object moving in an image under photographing or a new object is detected, when a photographed image is shaken by the shake of a camera, or when a user operates a specific button included in the dashboard camera, it is assumed that the dashboard camera is operated in such a way to terminate a file in which data is recorded up to now, create a new file, and continuously record image data recorded in a new created file ('event termination condition').

An operation principle and additional functions of the image recording device according to the present invention will be described in detail with reference to following drawings.

FIG. 2 is a flowchart schematically illustrating an adaptive data recording method according to an embodiment of the present invention. FIG. 2 illustrates a method of recording image data received from one camera when data of one channel is continuously received.

First, an image recording device 20 receives transmitted data (S101). Then, the image recording device 20 identifies a residual capacity remained in a storage medium 30 in order to record received data (S102). If the identified residual capacity is larger than a predetermined spare capacity (S103), the image recording device creates a new file (S104). In this case, the image recording device configures a cluster chain by sequentially connecting addresses of usable clusters and records received data in actual area of each cluster of the created cluster chain (S105).

Meanwhile, when a predetermined file termination interrupt occurs during recording the data in a file at step 105, the image recording device identifies whether a file under data recording satisfies a file termination condition (S106). The file termination condition may include a normal termination condition, for example, where image data is stored for a predetermined time and another event termination condition.

In this case, if at least one file termination conditions is satisfied so that a file is terminated, the image recording device immediately records received image data in a new file. In this case, it is preferred that a file terminated by the normal termination condition is distinguished from a file terminated by the event termination condition by using different file names.

Meanwhile, when at least one of the file termination conditions is satisfied so that a file is terminated, the image recording device identifies a file size change condition in order to determine whether to change the size of a file to be terminated (S107).

The change of a file size according to the present invention includes changing the size of a terminated file to a predetermined fixed size by additionally connecting several clusters to a cluster chain.

If a file to be terminated satisfies a predetermined file size change condition, the image recording device changes the size of a file to be terminated to a predetermined fixed size and then terminate the file, by additionally connecting addresses of recordable clusters (that is, clusters configuring a residual capacity of a storage medium or clusters which are not included in files in which image data is recorded) to a current cluster chain of a file to be terminated (S108). Alternatively, after a file to be terminated is terminated, the image recording device may change the size of a file to a predetermined fixed size by an additional operation.

For example, the size of a file obtained by recording the image data encoded with a H.264 codec for one minute may be in the range of about 54 MB to 56 MB. Based on the above, the file size change condition may be set as a condition where the size of a file to be terminated is in the range of 50 MB to 56 MB. Alternatively, a predetermined size (or fixed size) to be adjusted by adding cluster addresses may be, for example, 56 MB.

That is, the size of a file recorded for one minute according to the normal termination condition may be, for example, 55.234 MB, 52.654 MB, or 54.005 MB. The size of the above files may be adjusted to a constant fixed size of 56 MB.

In contrast, when a file to be terminated does not satisfy the file size change condition (that is, the size of a file to be terminated exceeds 56 MB or is less than 50 MB), the image recording device may terminate the file without changing the size of a file to be terminated (S109).

When a file is terminated, the image recording device may check whether the recording termination condition is satisfied (S110). If the recording termination condition is not satisfied, the routine returns to step S102 so that the image recording device continuously records the received image data. The recording termination condition may include the selection of a recording end function by a user, power off of an image recording device by the user, or power off by self control of the image recording device due to low voltage of an external power source.

Meanwhile, if a residual capacity of the storage medium 30 is less than a predetermined spare capacity (S111), the image recording device may select any one from terminated files stored in the storage medium 30 after recording (S112), and may store received image data which are received at this time in such a way that only data of a actual storage area indicated by a cluster chain are overwritten by reusing a cluster chain of the selected file. In this case, a file name and other attributes may be changed by correcting the directory entry of a file.

Meanwhile, it is preferred not to change a reused cluster chain, when the cluster chain is reused by means of selecting a previously terminated file through steps S111 and S112. That is, it is preferred that parts which are not used during current recording are invariably maintained by means of terminating the file without changing the cluster chain, even if an event termination condition occurs during recording data so that the file should be terminated. The unused parts of the cluster chain may be maintained as a dummy. Accordingly, a file once adjusted to a fixed size maintains the size (that is, the cluster chain is maintained) except for a special case (for example, when the file is changed to a file larger than the fixed size).

Further, if the size of a file selected for reuse is not a fixed size, data is recorded reusing a corresponding file. When the file is terminated according to the normal termination condition or the event termination condition, the size of the file may be changed to the fixed size.

In the present example, the spare capacity may be set to, for example, about twice of the fixed size. Moreover, the selected file for reuse may be, for example, a file in which data has been recorded at the oldest time point.

In the data recording scheme according to the conventional art, as the number of deleting previously created files and recording new data in a space created due to deletion is increased, there is an increased possibility of failure occurrence that a wrong cluster address is recorded in a cluster chain configured for a new file, a cluster chain configures an infinite loop, or a cluster address already used in a cluster chain of another file is repeatedly used.

Accordingly, the object of the present invention is to minimize the change of once created cluster chain by correcting only a file name of a file in which image data has already been recorded and reusing the cluster chain without change.

Next, a process for handling a case where the size of a file selected for reuse is not adjusted to a fixed size is described.

First, if a recorded and terminated file is selected to reuse a cluster chain, recording data is performed reusing the cluster chain regardless of the size of the selected file.

Meanwhile, when the file termination condition is not satisfied so that the cluster chain is insufficient even if image data must be continuously recorded, image data is continuously recorded while extending a chain by sequentially and continuously connecting a cluster address to a current cluster chain. Then, if image data is recorded for one minute so that the normal file termination condition is satisfied, a file may be terminated after being adjusted to a fixed size.

That is, even if a file is not adjusted to a fixed size in first recording, the file may be adjusted to a fixed size when the file is reused and image data is recorded.

Next, it may be considered that at step S111 a residual capacity is smaller than minimum value of a spare capacity (minimum spare capacity). In the present example, the spare capacity is set to about twice of a fixed size. Meanwhile, the minimum spare capacity may be set to about a fixed size.

In case the residual capacity is less than the minimum spare capacity when identifying the residual capacity of a storage medium for recording data, the image recording device may select one from the files which are terminated after data recording, delete the selected file, and obtain a new residual capacity using a capacity of the deleted file and an existing residual capacity. Further, the image recording device may again determine whether to create a new file or to reuse another terminated file by comparing the obtained residual capacity with the spare capacity. In this case, a file selected for deletion may be a file in which data has been recorded at the oldest time point or a file having the smallest capacity.

Next, a method for recording adaptive data according to another embodiment of the present invention will be described with reference to a flowchart shown in FIG. 3. The present embodiment relates to simultaneous recording when image data from each of two cameras (which may include microphone) is simultaneously received through respective channels. This may be the case where, for example, forward image data (first data) in which a forward direction of a vehicle is photographed and rearward image data (second data) in which a rearward direction of the vehicle is photographed are simultaneously received, and the forward image data is recorded in one file (first file) and simultaneously rearward image data is recorded in another file (second file).

In particular, it is assumed in the present embodiment that the size of a forward image file in which data is recorded for one minute differs from that of a rearward image file in which data is recorded for the same time, because the image quality of a forward image differs from that of a rearward image.

First, an image recording device 20 may receive both or one of first data in which a forward image is photographed and second data in which a rearward image is photographed (S202).

The image recording device 20 determines whether two data are simultaneously received or only one of the two data is received (S203). If only one data is received, the routine may proceed to step S102 of FIG. 2 to perform a step of recording image data of a single channel.

If, at step S203, the reception of second image data is stopped and only first image data is recorded while recording respectively first image data and second image data received through two channels in first file and second file, the image recording device may select second file to change to first file in a predetermined order (for example, a creation order or an termination order of file, or a file size order), and may record the first image data by reusing a cluster chain of a selected file.

In contrast, if second data starts to be received from another channel in the middle of recording the image data (for example, the first data) of a single channel, the image recording device regards that an event termination condition is satisfied so that a file under data recording is terminated and the routine returns to step S203. Then the image receiving device may perform recording for two channels. That is, if the second data is additionally received while only the first data is received and recorded in the first file, any one of the first file is selected in a predetermined order (for example, a creation order or an termination order of file or a file size order) and is changed to a second file, and the second data may be recorded reusing a cluster chain of the selected first file. Alternatively, when a first file is changed to a second file reusing a first file, the cluster chain may be adjusted to a second fixed size.

If it is determined that data is received from two channels, respectively (S203), the image recording device identifies a residual capacity remaining in a storage medium 30 (S204). If the residual capacity is larger than a predetermined spare capacity (S205), the image recording device creates new files (first file and second file), respectively (S206), and records first data and second data in designated files, respectively (S207).

Meanwhile, if the file termination condition is satisfied while recoding data in first file and second file (S208), the image recording device identifies the size change condition of each file (S209).

In the present embodiment, since two files are simultaneously created, the size change condition may be set respectively to each file. For example, when a file must be terminated every 1 minute according to the normal termination condition, the size of first file may be in the range of 52 MB to 56 MB, and the size of second file may be in the range of 35 MB to 40 MB. In this case, the size change condition for the first file (or first size change condition) may be 50 MB to 56 MB and a fixed size (or first fixed size) may be set to 56 MB. Further, the size change condition for the second file (or second size change condition) may be 35 MB to 40 MB and a fixed size (or second fixed size) may be set to 40 MB.

Accordingly, when the first file satisfies the first size change condition at step S209, the first file is changed to the fixed size of 56 MB by connecting an additional cluster address to a cluster chain of the first file and may be terminated. In addition, when the second file satisfies the second size change condition at step S209, the second file is changed to the fixed size of 40 MB by connecting additional cluster address to a cluster chain of the second file and may be terminated (S210). The above change operation may be independently performed to every file.

Meanwhile, if the first file and/or the second file do not satisfy each of size change condition, the files will be terminated with capacity created until now (S211).

If recording of the first file and the second file is terminated, the image recording device checks whether the recording termination condition is satisfied (S212), and the routine returns to step S202 in order to continuously record in a new first file and a new second file the first data and the second data.

Meanwhile, if the residual capacity is less than the spare capacity (S221), the image recording device may record data in such a way to select the previously terminated files and reuse cluster chains of the selected files (S222). That is, in order to record the first data, a terminated first file may be selected and a cluster chain thereof may be reused. In order to record the second data, a terminated second file may be selected and a cluster chain thereof may be reused.

Meanwhile, when the first file must be terminated according to the file termination condition while recording the first data reusing the first file changed to the first fixed size, although the size of a file in which data is recorded up to now is less than the first fixed size, the first file may be terminated without shortening or changing a reused cluster chain. In this manner, it is preferred to maintain a cluster chain of a file previously adjusted to the fixed size without change at the time of file reuse. Such processing is the same as the second file.

Meanwhile, in another embodiment, the first fixed size and/or the second fixed size may be variably defined. For example, after the first file and/or the second file are recorded with a capacity larger than a predetermined capacity or with a number larger than a predetermined number, each preferred fixed size of the first file and/or the second file may be determined based on each storage size of the first file and/or the second file.

According to the image data recording method as described above, since the number of a new file and a new cluster chain created each time a file termination interrupt occurs may be minimized, the occurrence of failure in a FAT file system may be minimized.

Further, the above method is convenient for a user compared with a method according to the conventional art in which files having a predetermined size are created by configuring in advance a cluster chain having a predetermined size before using a storage medium. That is why it takes a long time to configure in advance files having a fixed size before using a storage medium. In particular, the larger the capacity of a storage medium is, the longer required time is.

Moreover, the method according to the present invention adaptively creates files and reuses the created files each time the channel number of received data is changed, so that a storage space may be efficiently used.

Hereinafter, an example of two channel simultaneous recording process of recording first data and second data by configuring first file and second file in an embodiment shown in FIG. 3 is described with reference to FIG. 4.

In this example, first file size change condition is the range of 50 MB to 56 MB, first fixed size is 56 MB, second file size change condition is in the range of 35 MB to 40 MB, and second fixed size is 40 MB.

Furthermore, in this example, the overall size of a storage medium is 400 MB, a spare capacity is 200 MB, and a minimum spare capacity is 100 MB.

Referring to FIG. 4(a), first image for 40 seconds is recorded in primary first file 1F, and the file 1F is terminated as a file of 40 MB. Second image for 40 seconds is recorded in primary second file 1R, and the file 1R is terminated as a file of 30 MB. Image for 60 seconds is recorded in each of secondary first and second file 2F and 2R, and the files 2F and 2R are normally terminated and have file sizes of 56 MB and 40 MB. Also third first and second file 3F and 3R are normally terminated and have file sizes of 56 MB and 40 MB. Meanwhile, image for 27 seconds is recorded in each of fourth first file and second file 4F and 4R, and the files 4F and 4R are terminated and have file sizes of 25 MB and 15 MB. In this case, a residual capacity of the storage medium 30 has 93 MB.

As a result of checking a residual capacity of the storage medium 30 in order to continuously record the first data and the second data, since the residual capacity of 93 MB is less than a minimum spare capacity, a residual capacity must be obtained by deleting any files among previously terminated and stored files. In general, the oldest files 1F and 1R will be selected and deleted.

Files 1F and 1R are deleted so that a residual capacity is increased to 168 MB as in FIG. 4(b). Meanwhile, in order to record the data, a residual capacity is checked again. Since an obtained residual capacity is between a minimum spare capacity and a spare capacity, any files will be reused. Selected files may be the oldest files, 2F and 2R.

Meanwhile, since each of files 2F and 2R satisfies a fixed size, first data and second data may be recorded using invariably a cluster chain of the file 2F and the file 2R. In this case, the name of the files may be changed to 5F and 5R, and necessary file attributes thereof may be changed.

However, after an image for 47 seconds is recorded, fifth files 5F and 5R are terminated according to an event termination condition. In this case, although the size of a file recorded for 47 seconds is small enough not to satisfy the size change condition, the files 5F and 5R are terminated without changing a cluster chain of reused files 2F and 2R.

Even after the fifth files 5F and 5R are terminated, since a residual capacity maintains 168 MB, as shown in FIG. 4(c), the oldest files 3F and 3R will be reused. The names of the files 3F and 3R are changed to 6F and 6R. However, the cluster chain is used as it is so that image data is recorded.

After image is recorded for 39 seconds, sixth files 6F and 6R are also terminated according to the event termination condition. In this case, sixth files 6F and 6R are terminated without changing a cluster chain of reused files 3F and 3R.

Since a residual capacity is 168 MB even after the files 6F and 6R are terminated, the image recording device 20 will attempt to record seventh files 7F and 7R using the oldest files 4F and 4R. As shown in FIG. 4(d), sizes of the files 4F and 4R do not satisfy each reference fixed size. Accordingly, a cluster chain of files 4F and 4R is used as it is. However, since the capacity thereof is less than first and second fixed sizes, respective data will be continuously recorded while extending a cluster chain by using cluster addresses of a residual capacity in a storage medium. Accordingly, cluster chains of the files 4F and 4R are extended, and file names thereof are changed to 7F and 7R, respectively (FIG. 4(e)). A residual capacity is reduced to 112 MB. Since the reduced residual capacity is in the range of a minimum spare capacity to a spare capacity, next image data will be recorded reusing files 5F and 5R adjusted to a fixed size.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

What is claimed is:

1. An adaptive data recording method of recording data in a storage medium using a file allocation table (FAT) file system by a data recording device, the method comprising steps of:
    i) receiving the data;
    ii) creating at least one file in which the data is recorded, configuring a cluster chain by sequentially connecting cluster addresses according to an FAT of the storage medium, and recording the data at an actual position of each cluster address;
    iii) when a file termination interrupt occurs, terminating the file by terminating the cluster chain of the file under data recording, creating a new file, configuring a new cluster chain, and continuously recording the data, wherein, when the file is terminated according to the file termination interrupt, the size of the file to be terminated is changed to a predetermined fixed size by adding at least one cluster address to the cluster chain if the size of the file in which the data is recorded up to the file termination interrupt satisfies a predetermined size range within the predetermined fixed size; and
    iv) if a residual capacity of the storage medium is less than a predetermined spare capacity when creating the new file, selecting at least one file which is terminated after previous data recording, and continuously recording the data reusing the cluster chain of the selected file, wherein, when the new file is terminated, an unused portion of the reused cluster chain of the selected file is maintained even if the size of the new file is smaller than that of the selected file.

2. The adaptive data recording method of claim 1, wherein step iv) further comprises:
    when the size of a file selected in order to reuse the cluster chain is less than a lower limit of the predetermined size range, continuously recording the data by extending the cluster chain by sequentially and additionally connecting a cluster address in the residual capacity to the cluster chain of the file.

3. The adaptive data recording method of claim 1, wherein step iv) further comprises:
    when the size of a file selected to reuse the cluster chain is less than a lower limit of a predetermined size range and the residual capacity of the storage medium is less than a minimum of spare capacity of the storage medium, deleting the selected file, selecting another file, and continuously recording the data reusing the cluster chain of the selected another file.

4. The adaptive data recording method of claim 1, wherein the adaptive data recording method is a vehicle image recording method of recording image and/or sound data around a vehicle recorded by an image recording device, and
    the file termination interrupt comprises at least one of recording the image and/or sound data for a predetermined time, stopping the supply of an external power source to the image recording device, detecting shock by the image recording device, stopping or restarting the reception of the image and/or sound data, finding a new object different from a previous one in a recorded image, or a specific operation by a user for the image recording device.

5. An adaptive data recording method of recording first and second data in a storage medium using a file allocation table (FAT) file system by a data recording device, the method comprising steps of:

i) receiving the first and second data;

ii) creating a first file in which the first data is recorded and a second file in which the second data is recorded, configuring first and second cluster chains respectively by sequentially connecting cluster addresses with reference to an FAT of the storage medium, and recording the first and second data at actual positions of each cluster address of the cluster chains, respectively;

iii) when a file termination interrupt occurs, terminating the first and second files by terminating the cluster chain of each file under data recording, creating new first and second files, configuring new first and second cluster chains of the new first and second files, and continuously recording the first and second data in each file, wherein when the first and second cluster chains of the first and second files are terminated according to the file termination interrupt, if the size of the first file in which data is recorded up to the file termination interrupt satisfies a first predetermined size range, the size of the first file to be terminated is changed to a first predetermined fixed size by adding at least one cluster address to the first cluster chain; and if the size of the second file in which data is recorded up to the file termination interrupt satisfies a second predetermined size range, the size of the second file to be terminated is changed to a second predetermined fixed size by adding at least one cluster address to the second cluster chain; and iv) if a residual capacity of the storage medium is less than a predetermined spare capacity when creating the new first and second files, selecting at least one of the first and second files which are terminated after previous data recording, and continuously recording the first and second data by reusing first and second cluster chains of the selected first and second files, wherein, when the new first and second files are terminated, an unused portion of the reused cluster chain of the selected first or second file is maintained even if the size of the new first or second file is smaller than that of the selected first or second file.

6. The adaptive data recording method of claim 5, wherein when the reception of the second data is stopped, changing the second file which is terminated after data recording to a new first file and recording the first data; and then when the reception of the second data restarts, changing the first file which is terminated after data recording to a new second file and recording the second data.

* * * * *